Figure 1:
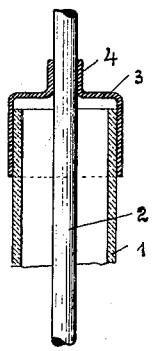

Dec. 8, 1925.

O. KRUH ET AL

SEAL FOR LEADING IN WIRES

Filed Dec. 23, 1920  2 Sheets-Sheet 1

Oscar Kruh,
Ernst Wolf, Inventors.
Bennie, Davis, Marvin & Edmonds,
Attorneys.

Dec. 8, 1925.

O. KRUH ET AL 1,564,690

SEAL FOR LEADING IN WIRES

Filed Dec. 23, 1920    2 Sheets-Sheet 2

Osias Kruh,
Ernst Wolf, Inventors.
Pennie, Davis, Marvin & Edmonds,
Attorneys.

Patented Dec. 8, 1925.

1,564,690

UNITED STATES PATENT OFFICE.

OSIAS KRUH AND ERNST WOLF, OF VIENNA, AUSTRIA.

SEAL FOR LEADING-IN WIRES.

Application filed December 23, 1920. Serial No. 432,788.

(GRANTED UNDER THE PROVISIONS OF THE ACT OF MARCH 3, 1921, 41 STAT. L., 1313.)

*To all whom it may concern:*

Be it known that we, OSIAS KRUH and ERNST WOLF, the first a citizen of the Republic of Poland, and the second a citizen of the Republic of Austria, residing at Vienna, Austria, VI, Mariahilferstrasse 47, have invented certain new and useful Improvements in Seals for Leading-in Wires (for which we have filed applications in Germany, Nr. 346,111, filed August 14, 1918; Germany, A. 69,750, VIII/21g, filed Aug. 6th, 1919; Switzerland, Nr. 102,131, filed June 13, 1919; Switzerland, Nr. 102,414, filed June 30, 1923; Italy, Vol. 532, Nr. 55 (Nr. 175,426), filed June 12, 1919; France, Nr. 518,633, filed June 30, 1919; Great Britain, Nr. 148,127, filed July 9, 1920, and Nr. 148,522, filed July 10, 1920), of which the following is a specification.

It is well known in the art that it is very difficult to lead into glass vessels electric currents of high amperage, if the current conductor is to be air-tightly sealed to glass. Currents of high intensity require conductors of large cross-section in which case even platinum presents considerable difficulties, because of the resulting strain in the glass making the glass crack at the seals and thus rendering the seal untight.

It has already been proposed to use metal caps for leading-in electric currents, which are sealed to one end of a glass tube connected to a main glass vessel. The current conductors are fastened to the caps. It has been found that if the walls of the cap consisting of platinum or copper are too thick, the glass tube cracks after a longer or shorter period of time at that part of the tube where it leaves the cap. This is due to the fact that the strain in the glass is greater inside than outside of the thick-walled cap, and that the transition in the strain is too sudden. It has also been proposed to make the walls of the caps so thin that it becomes very pliable, the result being that the strain of the glass inside the cap is diminished and the transition in the strain to the part of the glass free from strain becomes more gradual, so that cracks do not happen so often.

There arises however another difficulty in that comparatively heavy current conductors cannot be well fastened to the thin bottom of the cap, so that this device can only be used for currents of very low amperage.

The subject matter of the present invention consists of a cap of any suitable metal which serves to hermetically seal on opening of a glass vessel or the end of a glass tube connected to such vessel, the vessel forming the casing for an electrical apparatus, such as for example an incandescent electric lamp, a Röentgen tube, a rectifier or the like. The rim or edge of the metal cap which is to be sealed to the glass is thin while the remaining dimensions of the cap may be chosen as thick and strong as is desired in order to obtain the necessary mechanical strength and rigidity, for example to make the cap capable of carrying conductors of any desired thickness to lead the electric current into the glass vessel. The shape of the cap may also be chosen as may be required for the purpose for which the vessel is intended.

If the rim of such a cap is tapered toward the edge or the edge is sharpened it may be connected to the glass by fusion without any danger to the glass even though the coefficient of expansion of the metal may be very different from that of the glass because the edge fused into the glass is so pliable that even large variations of temperature will not produce sudden differential strains in the glass at the point where the metal of the cap leaves the glass.

Figure 6:
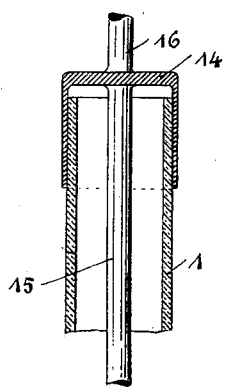
Figure 7:
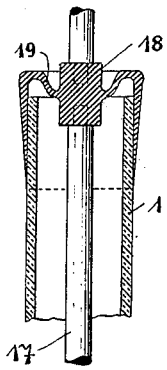
Figure 8:
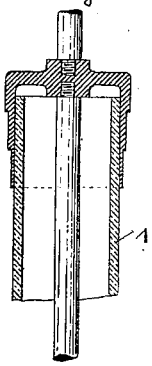
Figure 19:
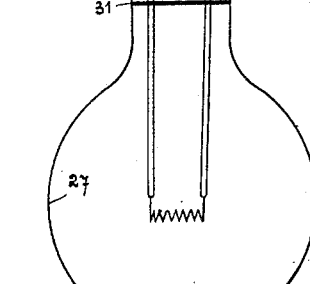
Figure 20:
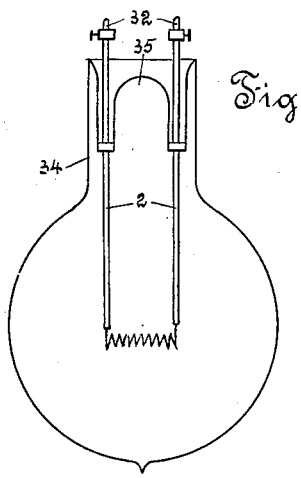

Figures 1 to 5 show five different constructions of the device for leading-in undivided current conductors in glass vessels, Figures 6 to 8 show three constructions of such a device for divided conductors, Figures 9 to 18 illustrate a number of constructions of the device with divided conductors, fastened to the metal body by clamping and Figures 19 and 20 show two electric incandescent lamps provided with devices for leading-in currents of high intensity as mentioned above.

Figure 2:
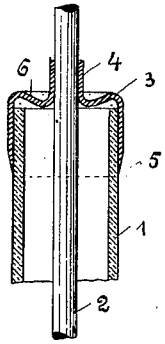

In Fig. 1, 1 is the glass tube, fixed to the aperture of the glass vessel, say of an incandescent lamp, as shown in Fig. 19, through which aperture the electric current is to be led in into the bulb of the lamp. This bulb is provided with two glass tubes 1 for the two conductors 2 carrying the incandescent wire. These glass tubes 1 have a diameter sufficiently large to avoid any contact of their walls with the inserted conductors. The end of each glass tube 1 carries a cap 3 serving as connecting body between the glass and the conductor 2, this cap having a short tube 4 extending from its bottom through which tube the current conductor 2 passes and is hermetically soldered therein. The air-tight connection between the cap 3 and the glass tube 1 can be effected in a different manner: by means of a cement or an electrolytic or metallizing process, i. e. by a cold process, in which case the walls of the cap 3 may be of any desired thickness. But the cap is also susceptible to be sealed to the glass tube by a fusing process. In this case the side walls of the cap should be thin and flexible (Fig. 1) in order to prevent dangerous strains in the glass walls of the tube 1; in order to prevent such dangerous strains in the glass it is sufficient to reduce the edge 5 of the metal cap 3 in thickness to such an extent that it is flexible; this can be obtained by sharpening the edge, whilst the remaining part of the cap may be of any desired thickness (Fig. 2). If the cap is of larger dimensions, it is advantageous to thin a portion of the bottom of the cap and to insert it between the glass and the conductor, as it is shown at 6 in Fig. 2, whereby a certain flexibility of the bottom is obtained, relative movements between the glass tube 1 and the conductor 2 thereby being allowed.

Figure 3:
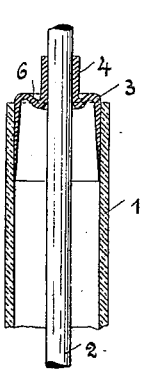

The metal cap 3 may also be fastened to the interior of the glass tube 1 as shown in Figure 3. The side-wall of the cap may increase in thickness from the edge towards the bottom. The connecting metal body should not necessarily be shaped as a cap as shown in Figs. 1 to 3; it may also be shaped as shown in Figures 4 and 5 for instance.

Figure 4:
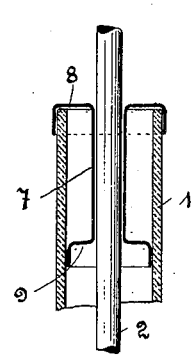

As shown in Fig. 4 the metal body consists of a metal tube 7 carrying at its ends the flanges 8 and 9 which flanges are hermetically sealed to the glass tube. The current conductor 2 is hermetically fixed within the tubular part 7.

The flanges 8 and 9 may be flexible in the longitudinal direction of the current conductor 2 in order to allow of relative movements.

Figure 5:
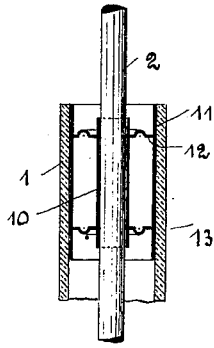

According to Fig. 5 the connecting body consists of a tubular part 10 arranged within a tube 11, air-tightly fixed to the interior of the glass tube 1 and connected to the tubular part 10 by means of discs 12 and 13 which may be flexible.

The conductors 2 are air-tightly fastened within the tube 10.

The constructions described use undivided current conductors or rods 2 passing through the connecting metal body sealing the aperture of the glass vessel for leading-in the electric current, provided this conductor be air-tightly fixed within the aperture of the metal body. The metal body itself does not hermetically close the aperture of the glass vessel, on account of its own opening for the insertion of the conductor. Figures 6, 7 and 8 illustrate constructions of metal caps which hermetically close for themselves the aperture of the glass vessel on account of their having an unperforated bottom. With such caps undivided current conductors cannot be employed any more; therefore it is necessary to use divided conductors, one of which being fixed to the outside and the other to the inside of the cap.

The cap 14 according to Fig. 6 is provided with a thin side wall and a bottom of such a thickness that conductor rods of any desired diameter may be safely fixed thereto, one 15 of which being fixed to the inside, the other 16 to the outside of the cap by soldering, screwing or like methods. The current flows then from the conductor 16 to 15 through the bottom of the cap 14. If the rods 16 and 17 have to be fixed to the bottom of the cap by screwing, the bottom may be locally thickened (see 18 in Fig. 7) so that screw threads may there be cut. The bottom may also be thinned around the thickened part (see 19 in Fig. 7) in order to secure flexibility of the bottom.

As for the rest, the cap may be shaped in a similar manner as shown in Figs. 1, 2 and 3. The thickness of the side-wall of the cap may be gradually or step by step reduced towards the edge (Figs. 7 and 8) or only the edge may be sharpened (Fig. 6). The cap may be sealed to the outer or to the inner side of the glass tube 1.

The cap or generally speaking the metal body may also be shaped in such a manner as to allow of fixing the conductor by clamping in different manners. Constructions of this kind are shown in Figs. 9 to 18.

Figure 9:
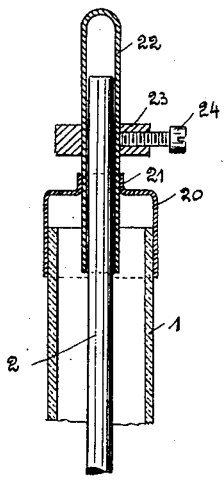

Fig. 9 shows a glass tube 1, to which a thin metal cap 20 is sealed from the outside of the glass tube. The bottom of the cap has a perforation 21 into which is soldered hermetically a metal pipe 22 closed at one end. Into this pipe 22 is inserted a current conductor 2 which is pinched tightly by means of a pinching ring 23, shoved over the pipe 22, and the screw 24, so that an electric connection is established between the pipe 22 and the conductor 2. The pinching ring 23 may also serve as a connection device for the electric source.

Figure 10:
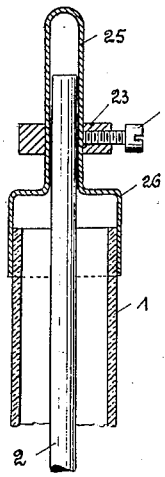

The device shown in Figure 10 differs from that in Figure 9 only in this respect that the pipe 25 and the cap 26 are made of one piece.

It is evident that by this method current conductors 2 of a very large cross-section can be used, so that electric currents of high intensity may be sent through these connecting caps. Fig. 19 shows an electric incandescent lamp of high candle power (200 amperes and from 30 to 50 thousand candles) using the cap connections according to Fig. 9 or 10. The glass bulb 27 has a neck 28, and opposite to it a second neck piece 29. At first two glass tubes 1 are fused on to the bulb, the glass tubes being already provided with the caps 26 and the metal pipes 25. Now the current conductors 2 to which is fastened the tungsten lighting body are inserted through the open outlet 29 into the glass bulb, until both its ends reach the pipes 25, where they are fastened by means of the pinching rings 23 and the screws 24. The outlet 29 is now closed, an evacuating tube put on to it, and the lamp evacuated, eventually filled with gas and finished. If it is required to have the lamp burn with its main axis in a horizontal position, then the heavy leads 2 are supported by the mica plates 30, 31, which are set into the neck 28, the leads passing through perforations in the mica plates.

It is to be understood that the manufacture of the lamp may be performed in any suitable manner and all known methods and machines known in the art may be used for this purpose.

Figure 11:
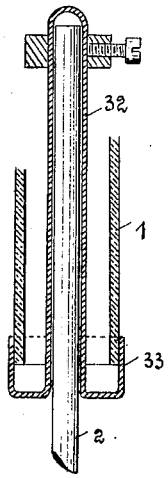

Figure 11 shows a type of connecting caps, where the metal pipe 32 is directed towards the inside of the cap 33, as used for instance in the lamp shown in Figure 20, where a lamp foot 35 with two glass tubes 1 is fused to the neck 34, the glass tubes projecting towards the inside of the glass bulb.

The current conductors 2 are inserted into the metal pipes 32, from the inside (see also Fig. 11) and the current connections are effected to the closed ends of the pipes 32, projecting from the lamp foot 35.

Figure 12:
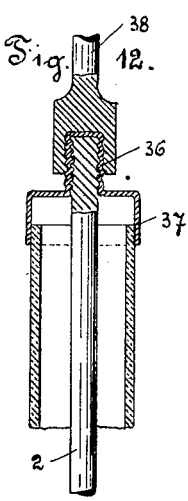

Fig 12 shows a construction of a connecting cap, where the pipe 36 of the cap 37 is screw-threaded on both sides. In the nut is screwed the screw shaped end of one current conductor 2, whereas the screw threads on the outside are engaged by the screw shaped end of the other current conductor 38, by which means a current conducting connection is established between the conductors 2 and 38. It is to be understood that the outside threads of the pipe 36 may be engaged by a ring, forming a nut, to which ring the other conductor is fastened in any suitable manner.

The metal cap may be varied in form in such a manner that the inside wall turns into the pipe directly without any special construction of the bottom of the cap, so that a pipe is formed closed at one end into which or over which the glass tube joined to the main glass vessel, is inserted to a certain depth and sealed to. The manufacture of the metal cap is so simplified and the contact surfaces between the inserted current conductors and the cap increased in a simple manner in order to diminish the contact resistance which is especially advantageous for the electric current of high intensity. The end of the inserted current conductor is shaped into a thick end piece which fills to a certain extent the space of the cap free of glass.

Figure 13:
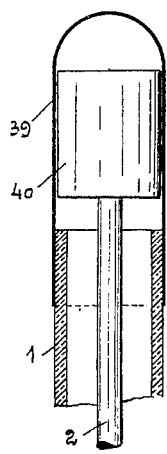

Fig. 13 shows a construction where to the end of the glass tube 1 is joined a metal pipe 39 closed at one end, the glass tube 1 projecting only to a certain depth into the pipe 39 and so sealed on. The end 40 of the current conductor 2 is enlarged like a piston, so that it more or less completely fills the cross-section of the pipe 39 and may be pinched tightly by means of a ring put over the pipe from the outside similar to the ring 23 of Figure 9 or 10. Since in this case, the diameter of the piston-shaped piece 40 has to be a little larger than the diameter of the glass tube 1 it has to be put into the cap prior to the sealing of the cap to the glass.

But it is not necessary to enlarge the piston-shaped end of the conductor to such an extent that it cannot be shifted through the glass tube 1. If the metal tube 39 is flexible, the piston-shaped end 40 may also be clamped from outside, if there is a larger interstice between the piston 40 and the inner wall of the cap than shown in Fig. 14 where the piston 40 is of such a diameter that it may be shifted through the pipe 1, so that the conductor may be inserted after the cap 39 having been sealed to the tube 1.

Figure 14:
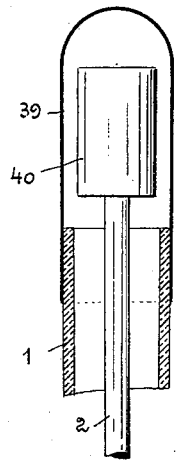
Figure 15:
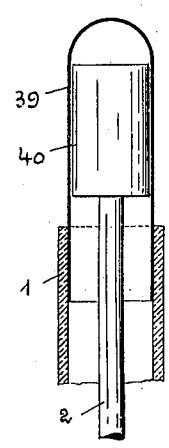

Fig. 15 shows a cap 39 sealed to the inside of a glass tube 1, in which case the piston shaped piece 40 of the end of the current conductor 2 may under equal conditions be of the same size as in the device shown in Figure 14 and still fit tight into the cap 39.

Figure 16:
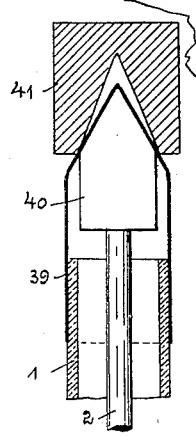

Figure 16 shows the closed end of the cap 39, shaped as a conus as well as the end surface of the piston shaped piece 40 of the conductor 2. The current conducting connection between the enlarged part 40 and the cap 39 being effected by the pinching jaw 41 pressed upon the cap in the direction of the axis, the jaw being also shaped conically. The vertex angle of the conus should preferably be a little smaller than that of the cap 39 and of the enlarged piece 40; in this case a certain pressure on the pinching jaw 41 is sufficient to secure a good connection without any other means of fastening.

Figure 17:
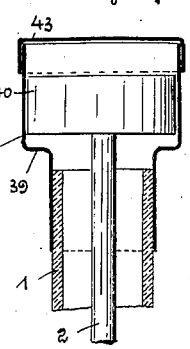

Fig. 17 shows the part 42 of the cap 39 free of glass enlarged in its diameter, so that it becomes necessary to make the chamber 42 of two parts in order to lead in the head 40. The device is now so fitted together that the current conductor 2 with the head 40 is put in from above while the chamber 42 is still open, then the cover 43 is set on the chamber 42 and soldered. The fastening of the head 40 is performed in the same manner as described in the other devices. In this manner the contact resistance between the cap and the current conductor is greatly diminished by the increase of the surfaces of contact.

Figure 18:
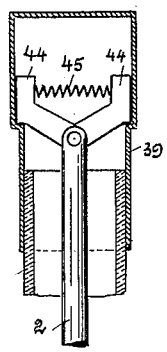

It is to be understood that the cap may be constructed in a variety of ways, it being essential that a cap closed from all sides forms an air-tight connection with the glass tube, which in its turn is connected with the main vessel, and that the end of the conductor inserted into the cap is brought to an electric contact with the cap by means acting from the outside. The end of the current conductor which is to be brought into contact with the cap, may also be made in many different ways, and it is possible for instance to make this end consisting of a few parts 44 moved apart by means of springs 45 in order to secure a good contact with the wall of the cap 39, as shown in Fig. 18.

These metal caps of all designs may be made of any desired material, because there is no danger of cracking of the glass in any case; in order to further diminish the danger of cracking, metals or alloys thereof may be chosen having equal or almost equal coefficient of expansion as has glass, for instance an alloy of nickel and iron.

What we claim is:

1. A device for hermetically sealing the ends of glass tubes comprising a metal cap, the side walls of which decrease in thickness toward the edge, said side walls being fused directly to the glass tube.

2. A device for hermetically sealing the ends of glass tubes comprising a metal cap the rim of which is tapered toward the edge, said rim being fused directly to the glass tube.

3. A device for leading electrical conductors into evacuated glass vessels comprising a cap having an open flange at the top thereof and a tapered rim, said rim being fused directly to the glass vessel.

4. A cap for sealing evacuated glass vessels comprising a tubular support of conducting material having a rim which tapers down toward the edge and a continuous conductor passing through the top of said cap, said rim being fused directly to the glass vessel.

5. A lead-in seal for evacuated glass vessels comprising a cap having a rim tapered toward the edge and means for affixing a conductor to said cap, said rim being fused directly to the glass vessel.

6. A device for sealing the ends of glass tubes comprising a cap having substantially the same coefficient of expansion as glass, the rim of which is tapered toward the edge, and which is fused directly to the glass tube.

7. A device for leading conductors into evacuated glass vessels comprising a cap, the coefficient of expansion of which is substantially the same as glass, having a rim tapering toward the edge and a flexible portion adapted to support a conductor, said rim being fused directly to the glass vessel.

8. In combination with an evacuated glass vessel having entering electrical conductors, a metal cap hermetically sealed to the walls of said vessel having a rim which tapers toward the edge and an electrical conductor sealed to said cap and passing therethrough, said rim being fused directly to the glass vessel.

9. A device for hermetically sealing an opening of a glass vessel having a tubular glass portion, comprising a metallic cap, the side wall of said cap being fused directly to the end of said tubular glass portion, the portion of said metal cap which is fused directly to the glass being thin at its edge so that it may follow the expansions and contractions of the glass material produced by changes in temperature.

10. A device for hermetically sealing an opening of a glass vessel having a tubular glass portion comprising a metallic cap, the side wall of said cap being fused directly to the tubular glass portion, and the portion of said metal cap which is fused directly to the glass material decreasing in thickness towards its edge, the other portions of said cap being of substantial thickness so as to retain and support an electrical conductor.

11. A device for hermetically sealing an opening of a glass vessel having a tubular glass portion, comprising a metallic cap, the side walls of said cap being fused directly to the tubular glass portion, that part of the metal cap which is fused directly to the glass being thin at its edge so that it may follow the expansions and contractions of the glass produced by changes of temperature and the other portions of the metallic cap being of substantial thickness and tubular in form, the diameter of the thick tubular portion of the cap being less than the diameter of the tubular portion of the glass vessel so that a conductor attached to and passing through said metal cap is supported clear of the tubular portion of the glass vessel.

12. A device for hermetically sealing an opening of a glass vessel having a tubular glass portion comprising a metallic cap, the side wall of said cap being fused directly to the tubular glass portion, said side wall being thin at its edge to enable it to follow the expansions and contractions of the glass produced by changes in temperature, means cooperating with the bottom of said cap to secure an electrical conductor thereto, the bottom of said cap being of substantial thickness so as to support an electrical conductor.

In testimony whereof we affix our signatures.

Dr. OSIAS KRUH.
Ing. ERNST WOLF.